United States Patent [19]

Iwai

[11] Patent Number: 5,040,954

[45] Date of Patent: Aug. 20, 1991

[54] IN-TANK TYPE MOTOR-OPERATED PUMP

[75] Inventor: Shingo Iwai, Fukuyama, Japan

[73] Assignee: Mitsubishi Denki Kabushiki Kaisha, Tokyo, Japan

[21] Appl. No.: 537,614

[22] Filed: Jun. 14, 1990

[30] Foreign Application Priority Data

Jun. 29, 1989 [JP] Japan .................... 1-167575

[51] Int. Cl.$^5$ ............................ F04B 39/00
[52] U.S. Cl. ........................ 417/423.12; 417/366; 123/509; 310/90; 310/237; 384/277
[58] Field of Search ............. 417/366, 423.3, 423.7, 417/423.12, 423.13, 423.14, 424.1; 123/497, 509; 310/90, 237; 384/277, 907.1, 913

[56] References Cited

U.S. PATENT DOCUMENTS

| 4,109,978 | 8/1978 | Ernst et al. ............... 384/277 |
| 4,320,931 | 3/1982 | Shaffer . | |
| 4,447,192 | 5/1984 | Tuckey ................... 417/366 X |
| 4,508,492 | 4/1985 | Kusakawa et al. ........ 417/366 |
| 4,741,677 | 5/1988 | Frigo ...................... 417/366 |
| 4,789,308 | 12/1988 | Tuckey ................... 417/366 X |
| 4,871,301 | 10/1989 | Buse ...................... 417/365 X |

FOREIGN PATENT DOCUMENTS

| 62-124316 | 6/1987 | Japan ................... 384/907.1 |
| 63-272994 | 11/1988 | Japan . | |
| 722061 | 1/1955 | United Kingdom . | |
| 1573913 | 8/1980 | United Kingdom . | |

Primary Examiner—Leonard E. Smith
Assistant Examiner—Eugene L. Szczecina, Jr.
Attorney, Agent, or Firm—Burns, Doane, Swecker & Mathis

[57] ABSTRACT

In an in-tank type motor-operated pump having a brush motor (1), a bearing (15) for rotatably holding a rotor shaft (5) is covered with a heat resistant insulating material (25) and is mounted in a bracket (22) in which brushes (4) are slidably held, thereby preventing an accidental shortcircuit between brushes (4) via the bearing (15) at the time when the bracket (22) melts with heat.

2 Claims, 4 Drawing Sheets

IN-TANK TYPE MOTOR-OPERATED PUMP

FIELD OF THE INVENTION AND RELATED ART STATEMENT

1Field of the Invention

The present invention relates to an in-tank type motor-operated pump, which is used in a liquid fuel tank of such a vehicle as an automobile, and more particularly to an improvement of a bearing which supports an end of a rotor shaft.

2. Description of the Related Art

In the conventional in-tank type motor-operated pump which includes a brush motor, a pair of brushes are generally arranged opposite to each other in a radial direction across a bearing which rotatably holds a rotor shaft. Both the brushes and the bearing are held and insulated to each other by a bracket of insulating material. Such a motor-operated pump is disclosed, for instance, in Japanese unexamined patent application (TOKKAI) Sho No. 63-272994.

However, in case where a rotor or an impeller fixed thereto is mechanically locked by any accident during the rotation, a large current continuously flows to the rotor through the brushes and noise suppressors which are provided beside the brushes. These brushes and noise suppressors are thereby heated extremely, and the bracket disposed around them melts with the heat. As a result, isolation among the brushes and the bearing can not be ensured, and this leads to a serious trouble such that the plus side brush and the minus side brush make contact with the bearing, resulting in a shortcircuit between the brushes.

OBJECT AND SUMMARY OF THE INVENTION

An object of the present invention is to provide an in-tank type motor-operated pump which is free from the possible shortcircuit of the brushes even at any accidental locked-rotor state.

In order to achieve the above-mentioned object, the in-tank type motor-operated pump of the present invention comprises:

a casing;

a motor which is mounted in the casing to cause pump action and has a commutator;

a bracket which is fixedly mounted in the casing to hold a rotor shaft of the motor and slidably holds a plurality of brushes each making an electrical contact with the commutator;

a bearing which is to be fixedly mounted in the bracket to rotatably hold the rotor shaft; and an insulating film which covers an outer surface of the bearing, the insulation film being of heat rsistant material.

According to the above-mentioned in-tank type motor-operated pump, even if the brushes make mechanical contact with a surface of the bearing, insulation between the brushes is secured by the insulating film.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, a preferred embodiment of the present invention is described with reference to the accompanying drawings.

Figure 1:
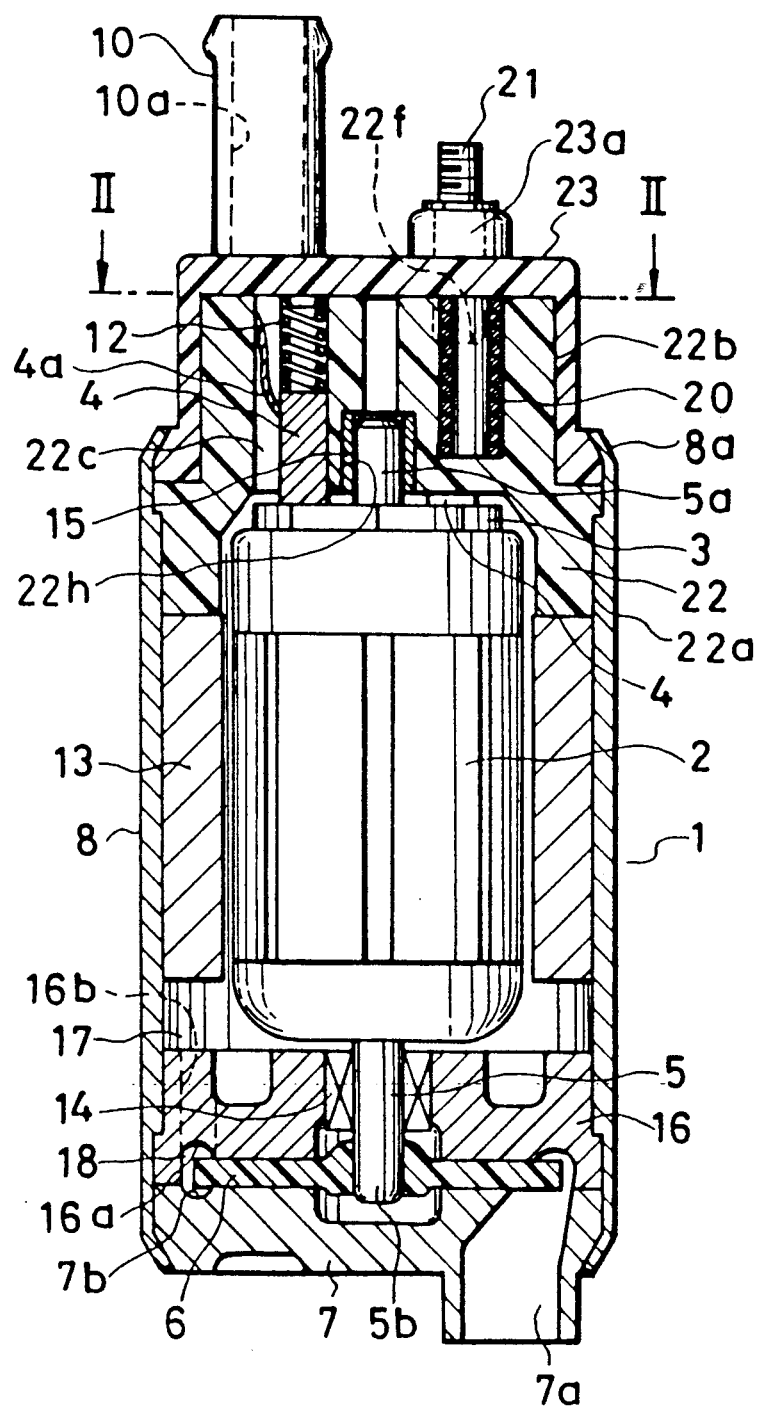
FIG. 1 is a cross-sectional view showing an in-tank type motor-operated pump of the present invention.

FIG. 1 is a cross-sectional view showing an in-tank type motor-operated pump of the present invention.

In the figure, a motor 1 has a rotor 2, a commutator 3, a pair of brushes (only one is completely visible) 4 and a stator 13 of a ferrite permanent magnet. An upper end part 5a of a rotor shaft 5 is held by a bracket 22 of an insulating material (e.g. polyacetal) via a bearing 15, and a lower end part 5b of the rotor shaft 5 is held by a braket 16 via a bearing 14. Both brackets 22 and 16 are fixed to a motor casing 8, thereby rotatably holding the rotor 2 from the motor casing 8. The stator 13 is fixedly held by the motor casing 8. Each of the brushes 4 is slidably held in the bracket 22 in the vertical direction and is urged by a spring 12 to pushingly make an electrical contact with the commutator 3. An electric power is supplied to the rotor 2 from a pair of terminals 21 via the brushes 4 and their pigtails 4a. An impeller 6, which makes pump action by its rotation, is fixed to the lower end part 5b of the rotor shaft 5 and is covered with a bottom cover 7. An inlet port 7a is formed in the bottom cover 7 and a part of the bracket 16, thereby rendering a blade part of the impeller 6 exposed therein. Along a part of a circumference of the impeller 6, a groove 16a is formed in the braket 16, and also a groove 7b is formed in the bottom cover 7. These grooves 16a and 7b make an arc-shaped passage 18 therebetween in a predetermined angular range. One end of the passage 18 is opened in the inlet port 7a and the other end is communicated with an inner space 17, which is between the motor casing 8 and the rotor 2, through an associated vertical passage 16b, thereby making communication between the inlet port 7a and the inner space 17. The bracket 22 is covered with a cover which is made of an insulating material and has an outlet tube 10 and a pair of pipe-shaped projections 23a (only one is visible). A terminal rod 21 is tightly fit into each of the pipe-shaped projections 23a. An upper end part of the terminal rod 21 is projected out of the pipe-shaped projections 23a so that external wires (not shown) can be connected. A lower end of the terminal rod 21 is mounted in the bracket 22 and is connected to an electrical-noise suppressor 20 which is mounted in the bracket 22, as described later.

Figure 2:
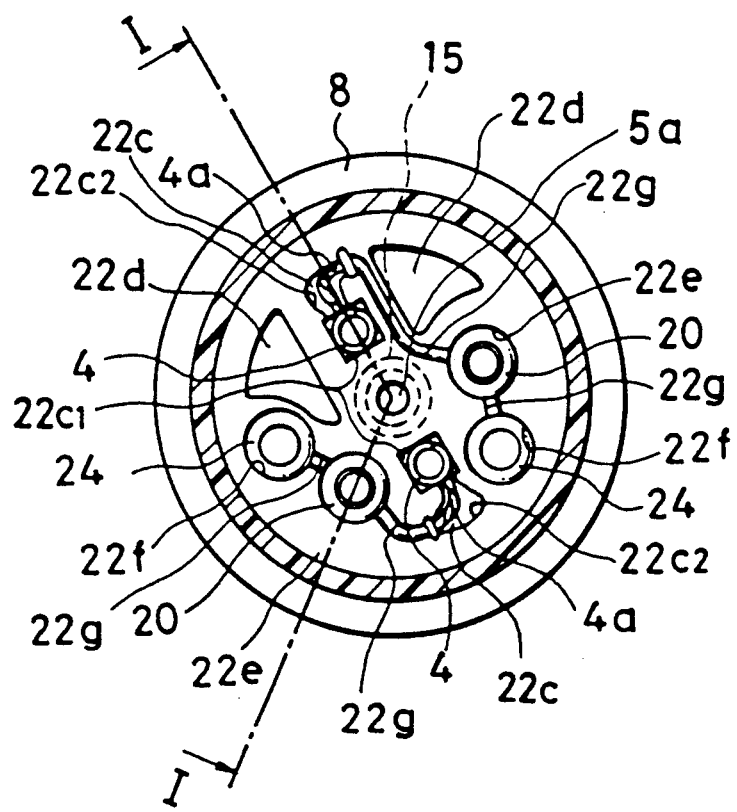
FIG. 2 is a plane view taken on line II—II in FIG. 1.

FIG. 2 is a plane view taken on line II—II in FIG. 1(FIG. 1 is the cross-sectional view taken on line I—I in FIG. 2). One end of the electric-noise suppressor 20 is electrically connected with a junction terminal 24, and the other end of the electric-noise suppressor 20 is electrically connected with the pigtail 4a of the brush 4. In the bracket 22, a pair of first through-holes 22c and a pair of second through-holes 22d are formed. Each of the first through-holes 22c is formed to have a rectangular-shaped main groove 22c1, in which the brush 4 and the spring 12 are to be held, and an auxiliary groove 22c2 which makes a recess for the pigtail 4a of the brush 4. Each of the second through-holes 22d allows fuel communication between an inner passage 10a (FIG. 1) of the outlet tube 10 and the inner space 17 (FIG. 1). Furthermore, a pair of holes 22e each having a bottom, a pair of holes 22f each having a bottom and four grooves 22g are formed in the bracket 22. Each of the electric-noise suppressors 20 is inserted into the hole 22e, and each of the junction terminals 24 is inserted in the hole 22f. Coil-lead portions of the electric-noise suppressors 20 are mounted in the grooves 22g.

Figure 3:
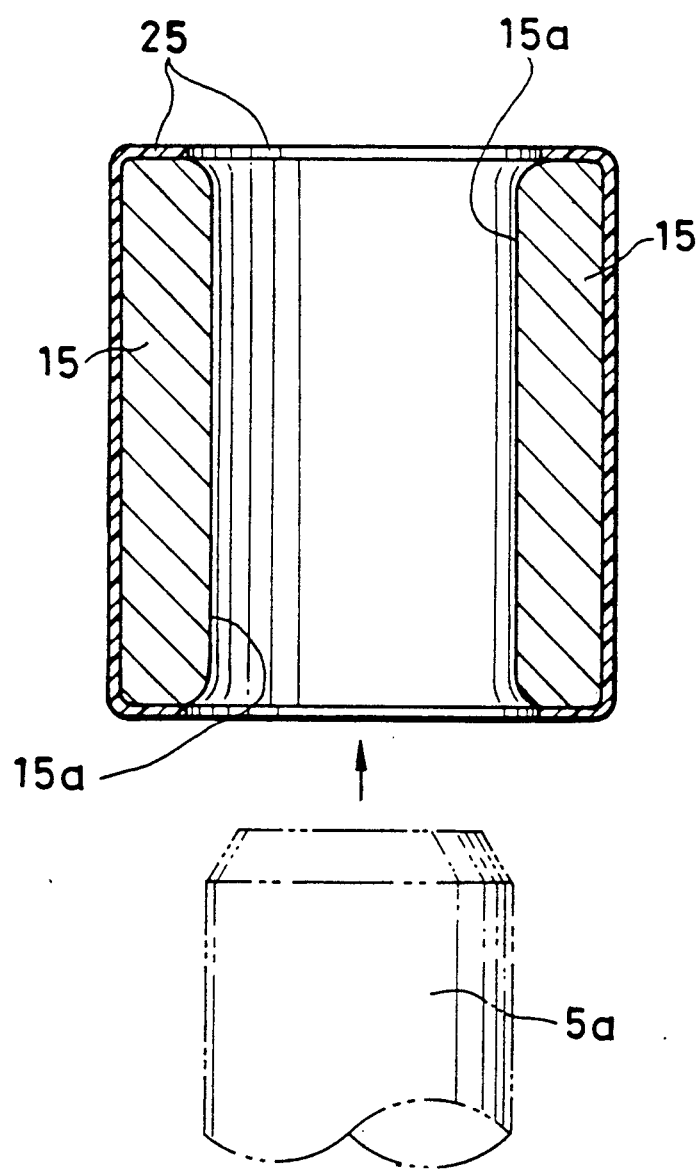
FIG. 3 is a vertical cross-sectional view showing a bearing 15.

FIG. 3 is a vertical cross-sectional view showing the bearing 15. The bearing 15 is made of such a metal as bronze, and an outer surface of the bearing 15 is covered with an insulating film 25. For instance, this insulating film 25 is formed by the powdered coating of an insulating, heat-resisting and chemical resistant material such as epoxy resin. The upper end part 5a of the rotor shaft 5 is rotatably held by an inner surface 15a of the bearing 15 with a minute gap therebetween. The bearing 15 with the insulating film 25 is tightly fit into a hole 22h (FIG. 1) formed in the center of the bracket 22.

In the above-mentioned in-tank type motor-operated pump, the rotor 2 and the impeller 6 fixed thereto rotate when the voltage is supplied to the rotor 2 through the terminal rods 21, the junction terminals 24, the electric-noise suppressors 20, the brushes 4 and the commutator 3. The liquid fuel (not shown) is thereby sucked up to the inlet port 7a and is forwarded to the outlet tube 10 through the inner space 17. From the outlet tube 10, the liquid fuel is fed to an engine (not shown).

When the rotor 2 or the impeller 6 happens to be mechanically locked by any accident during the rotation, a large current continuously flows to the rotor 2 through the brushes 4 and the electric-noise suppressors 20. The brushes 4 and the electric-noise suppressors 20 are thereby heated extremely, and the bracket 22 disposed around them melts with the heat. However, since the insulating film 25 has a sufficient heat resistance, electrical insulation among the brushes 4 and the bearing 15 is maintained. Short-circuit between the brushes is thus prevented.

Figure 4:
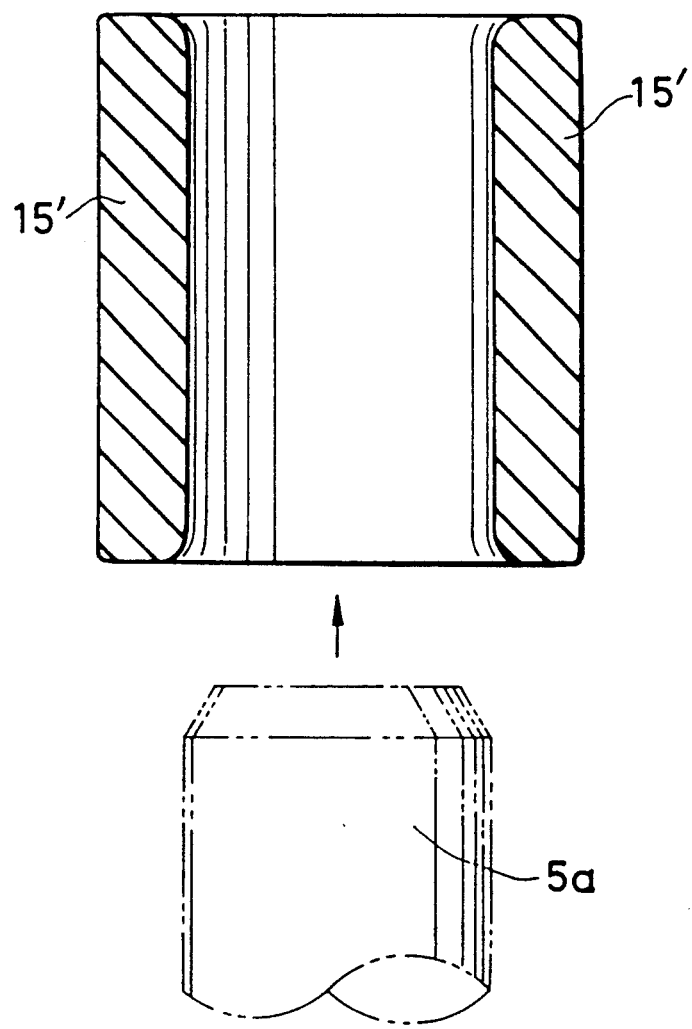
FIG. 4 is a vertical cross-sectional view showing a bearing 15' made of an insulating material.

Apart from the above-mentioned embodiment wherein the bearing 15 is covered with the insulating film 25, a modified embodiment may be such that a bearing 15', which is made of a heat-resistant insulating material such as ceramic, is employed instead of the metal bearing as shown in FIG. 4.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An in-tank motor-operated pump comprising:
   a casing;
   a motor which is mounted in said casing to cause pump action and which has a commutator;
   a bracket which is fixedly mounted in said casing to hold a rotor shaft of said motor and which slidably holds a plurality of brushes each making an electrical contact with said commutator;
   a bearing which is fixedly mounted in said bracket to rotatably hold said rotor shaft; and
   an electrically-insulating film covering an outer surface of said bearing, said insulating film being made of heat resistant material.

2. A in-tank type motor-operated pump comprising:
   a casing;
   a motor which is mounted in said casing to cause pump action and which has a commutator;
   a bracket which is fixedly mounted in said casing to hold a rotor shaft of said motor and which slidably holds a plurality of brushes each making an electrical contact with said commutator;
   a bearing which is fixedly mounted in said bracket to rotatably hold said rotor shaft, said bearing being made of heat resistant electrically-insulating material.

* * * * *